US010310651B2

United States Patent
(12) United States Patent
Xu et al.

(10) Patent No.: US 10,310,651 B2
(45) Date of Patent: Jun. 4, 2019

(54) TOUCH SCREEN, MANUFACTURING METHOD THEREOF AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Jiawei Xu, Beijing (CN); Gaoliang Shi, Beijing (CN); Lei Zhang, Beijing (CN); Tsungchieh Kuo, Beijing (CN); Ming Hu, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 155 days.

(21) Appl. No.: 15/651,154

(22) Filed: Jul. 17, 2017

(65) Prior Publication Data

US 2018/0024394 A1 Jan. 25, 2018

(30) Foreign Application Priority Data

Jul. 25, 2016 (CN) .......................... 2016 1 0591989

(51) Int. Cl.
*G06F 3/041* (2006.01)
*G02F 1/1333* (2006.01)

(52) U.S. Cl.
CPC ........ *G06F 3/0412* (2013.01); *G02F 1/13338* (2013.01); *G06F 3/041* (2013.01); *G06F 2203/04103* (2013.01)

(58) Field of Classification Search
CPC ........................................................ G06F 3/044
See application file for complete search history.

(56) References Cited

U.S. PATENT DOCUMENTS

| | | | | |
|---|---|---|---|---|
| 5,013,597 | A * | 5/1991 | Kracke | B60R 13/08 428/141 |
| 7,679,376 | B2 * | 3/2010 | Kang | G06F 3/044 324/658 |
| 9,645,019 | B2 * | 5/2017 | Duchaine | G01L 1/146 |
| 9,645,028 | B2 * | 5/2017 | Choong | G01L 9/0052 |
| 9,904,395 | B2 * | 2/2018 | Ogura | G06F 3/0414 |

(Continued)

FOREIGN PATENT DOCUMENTS

| | | | |
|---|---|---|---|
| CN | 1455291 | A | 11/2003 |
| CN | 101614891 | A | 12/2009 |

(Continued)

OTHER PUBLICATIONS

First Office Action for Chinese Application No. 201610591989.7, dated Jul. 30, 2018, 7 Pages.

*Primary Examiner* — Patrick F Marinelli
(74) *Attorney, Agent, or Firm* — Brooks Kushman P.C.

(57) ABSTRACT

The present disclosure provides a touch screen and a method for manufacturing the touch screen as well as a display device. The touch screen comprises a substrate, a conductive film layer and an insulating layer which are sequentially stacked, wherein the insulating layer is provided, on its surface away from the substrate, with protruding structures that are configured to increase the area of the surface of the insulating layer.

5 Claims, 3 Drawing Sheets

(56) References Cited

U.S. PATENT DOCUMENTS

| | | | | |
|---|---|---|---|---|
| 9,916,051 | B2* | 3/2018 | Schediwy | G06F 3/044 |
| 2002/0093610 | A1 | 7/2002 | Furukawa et al. | |
| 2003/0202133 | A1 | 10/2003 | Yun | |
| 2006/0254369 | A1* | 11/2006 | Yoon | A61B 5/6804 73/862.041 |
| 2008/0174321 | A1* | 7/2008 | Kang | G06F 3/044 324/686 |
| 2010/0097548 | A1 | 4/2010 | Koito et al. | |
| 2013/0047747 | A1* | 2/2013 | Joung | G01L 1/142 73/862.68 |
| 2013/0106736 | A1 | 5/2013 | Lee et al. | |
| 2013/0207930 | A1* | 8/2013 | Lin | G06F 3/044 345/174 |
| 2014/0085247 | A1* | 3/2014 | Leung | G06F 3/0414 345/174 |
| 2014/0176494 | A1 | 6/2014 | Huang | |
| 2015/0268784 | A1* | 9/2015 | Kallassi | G01R 27/2605 345/174 |
| 2015/0355039 | A1* | 12/2015 | Duchaine | G01L 1/146 73/862.046 |
| 2016/0041653 | A1* | 2/2016 | Schediwy | G06F 1/1692 345/174 |
| 2016/0252989 | A1* | 9/2016 | Zhang | G06F 3/041 345/173 |
| 2016/0363781 | A1* | 12/2016 | Wu | G02F 1/133377 |
| 2016/0364062 | A1* | 12/2016 | Lu | G06F 3/045 |
| 2018/0024394 | A1* | 1/2018 | Xu | G02F 1/13338 |

FOREIGN PATENT DOCUMENTS

| | | | |
|---|---|---|---|
| CN | 101726928 | A | 6/2010 |
| CN | 102013213 | A | 4/2011 |
| CN | 202372734 | U | 8/2012 |
| CN | 103085437 | A | 5/2013 |
| CN | 103885223 | A | 6/2014 |
| CN | 204613549 | U | 9/2015 |

* cited by examiner

TOUCH SCREEN, MANUFACTURING METHOD THEREOF AND DISPLAY DEVICE

CROSS-REFERENCE TO RELATED APPLICATION

This application claims a priority to Chinese Patent Application No. 201610591989.7 filed on Jul. 25, 2016, the disclosures of which are incorporated herein in their entirety by reference.

TECHNICAL FIELD

The present disclosure relates to the field of display technology, in particular to a touch screen, a manufacturing method thereof and a display device.

BACKGROUND

Direct bonding is a method in which a display screen and a touch screen are fully bonded together with no gap using an optical clear resin (OCR) or an optical clear adhesive (OCA). As compared with air bonding, the direct bonding technique eliminates air between the screens, and this helps reduce light reflection between the display panel and glass. As a result, the screen appears to be more transparent and the display effect of the screen may be improved.

However, due to inconsistency of reinforcing degrees of both sides of reinforcing glass for the touch screen, there is a stress difference between the both sides, thereby resulting in warping of the glass, and especially an OGS (one glass solution) touch screen is liable to be warped. For the direct bonding of the OGS touch screen and the display screen, there will be a risk that the peeling force of the adhesive is insufficient and the adhesive may fail.

SUMMARY

An object of the present disclosure is to provide a touch screen which can avoid the adhesive failure after the direct bonding of the touch screen and the display screen, and a display device comprising the touch screen.

Another object of the present disclosure is to provide a method of manufacturing the touch screen.

To achieve the objects of the present disclosure or solve the problem existing in the prior art, the present disclosure provides the following technical solutions.

According to one aspect, the present disclosure provides a touch screen comprising: a substrate, a conductive film layer and an insulating layer which are sequentially stacked, wherein the insulating layer is provided, on its surface away from the substrate, with protruding structures that are configured to increase the area of the surface of the insulating layer.

Optionally, the protruding structures are one or more of a frustum of a cone, a frustum of a pyramid, a rectangular parallelepiped, a spherical crown, a cone, a cylinder, and a prism.

Optionally, the protruding structures are frusta of a pyramid.

Optionally, the touch screen comprises a visible region and a non-visible region, wherein the protruding structures have a larger distribution density in the non-visible region than in the visible region.

Optionally, the protruding structures and the insulating layer are integrally formed.

According to a second aspect, the present disclosure further provides a display device, comprising a display screen and the touch screen as described above, wherein the display screen and the surface of the touch screen provided with the protruding structures are bonded using an adhesive.

Optionally, the adhesive includes an optical clear resin and/or an optical clear adhesive.

Optionally, the display screen comprises a liquid crystal display module and/or an organic light-emitting diode display screen.

According to a third aspect, the present disclosure further provides a method for manufacturing the touch screen as described above, comprising steps of:

forming a conductive film layer on a substrate;

forming an insulating layer on the conductive film layer; and forming, on the surface of the insulating layer away from the substrate, protruding structures that are configured to increase the area of the surface of the insulating layer.

Optionally, the protruding structures are frusta of a pyramid.

In the touch screen or display device provided in at least one embodiment according to the present disclosure, the insulating layer is provided on its surface away from the substrate with the protruding structures that are configured to increase the area of the surface of the insulating layer. Thus, when the touch screen and the display screen are bonded using an adhesive, these protruding structures can increase the contact area between the touch screen and the adhesive, thus increasing the peeling force between the touch screen and the display screen and avoiding the adhesive failure between the touch screen and the display screen.

BRIEF DESCRIPTION OF THE DRAWINGS

In order to illustrate the technical solutions of the present disclosure or the related art in a clearer manner, the accompanying drawings desired for the present disclosure or the related art will be described hereinafter briefly. Obviously, the following drawings merely relate to some embodiments of the present disclosure, and based on these drawings, a person skilled in the art may obtain other drawings or embodiments without any creative effort.

In FIGS. 1 to 6, reference signs are listed as follows:

100: touch screen; 10: substrate; 20: conductive film layer; 30: insulating layer; 40: black ink layer; 50: metal wiring layer; 60: transparent insulating layer; 300: display screen; 200: adhesive; a: protruding structure; $s_1$, $s_2$, $s_3$, $s_4$, and $s_5$: areas of side faces and top face of the protruding structure having a shape of a frustum of a pyramid, respectively; $s_6$: area of the cross-section of a channel between two protruding structures; f1, f2, f3, f4 and f5: forces applied to side faces and top face of the protruding structure having a shape of a frustum of a pyramid; f6: force applied to the cross-section of the channel between two protruding structures.

DETAILED DESCRIPTION

In order to make the objects, technical solutions and advantages of the embodiments of the present disclosure clearer, technical solutions in the embodiments will be described in a clear and complete manner in conjunction with the drawings. Obviously, the described embodiments are merely part of the embodiments of the present disclosure and are not intended to be exhaustive. Any other embodiments obtained by those having ordinary skill in the art based on these embodiments without any creative effort fall within the scope of the present disclosure.

Embodiment 1

Figure 1:
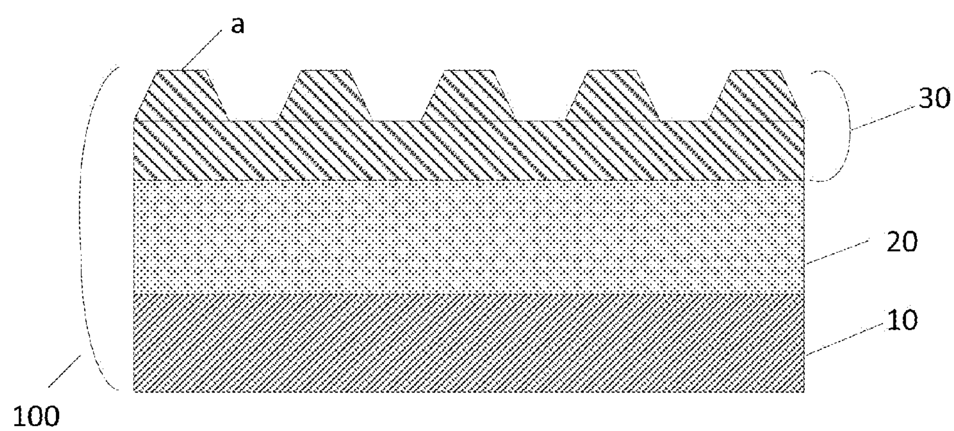
FIG. 1 is a structural schematic view of a touch screen provided in embodiment 1 according to the present disclosure.

FIG. 1 shows a structural schematic view of a touch screen provided in embodiment 1 according to the present disclosure. Referring to FIG. 1, embodiment 1 of the present disclosure provides a touch screen 100 that comprises a substrate 10, a conductive film layer 20 and an insulating layer 30 which are sequentially stacked.

The conductive film layer 20 may be a tin indium oxide (ITO) conductive thin film. The insulating layer 30 is provided, on its surface away from the substrate 10, with protruding structures a that are configured to increase the area of the surface of the insulating layer 30. The protruding structures a may be one or more of a frustum of a cone, a frustum of a pyramid, a rectangular parallelepiped, a spherical crown, a cone, a cylinder, and a prism.

Figure 2:
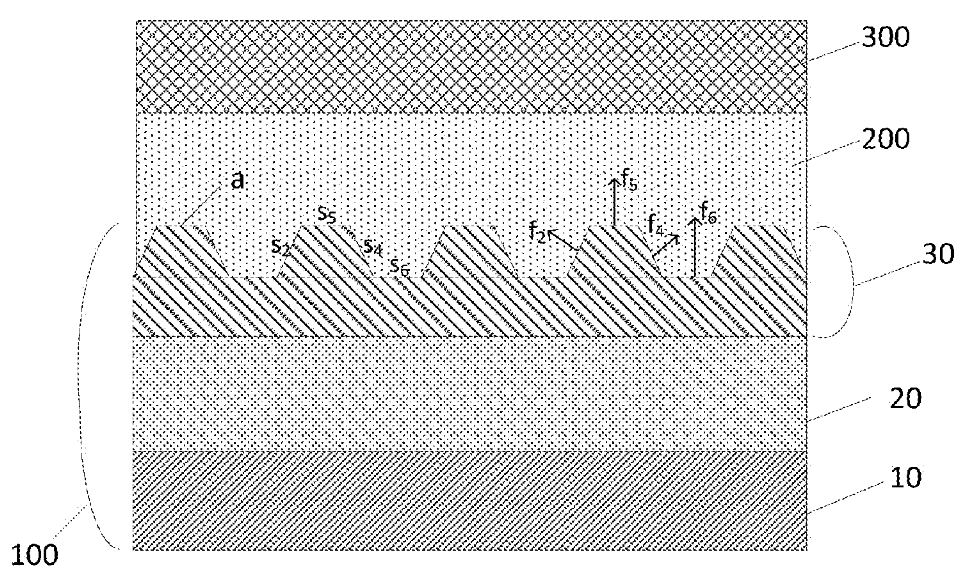
FIG. 2 is a schematic view of the touch screen according to the embodiment 1 that has been bonded with a display screen using an adhesive.

With reference to FIG. 2, when the touch screen 100 provided in this embodiment is bonded with a display screen 300 using an adhesive 200, the protruding structures are configured to increase the contact area between the touch screen 100 and the adhesive 200. The adhesive 200 may be an optical clear resin (OCR) or an optical clear adhesive (OCA). The display screen 300 may be a liquid crystal display module (LCM) or an organic light-emitting diode (OLED) display screen.

In the touch screen provided in this embodiment of the present disclosure, the insulating layer is provided, on its surface away from the substrate, with the protruding structures configured to increase the area of the surface of the insulating layer. When the touch screen and the display screen are bonded using an adhesive, these protruding structures can increase the contact area between the touch screen and the adhesive, thus increasing the peeling force between the touch screen and the display screen and avoiding the adhesive failure between the touch screen and the display screen.

In an optional embodiment, the protruding structures a are frusta of a pyramid. The frustum of a pyramid has an advantage of having a larger surface area and more uniform dispersion of forces than other structures. This will be analyzed below with reference to FIGS. 2 to 4.

Figure 3:
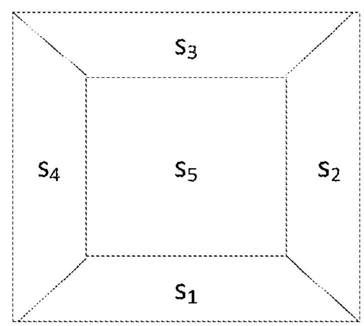
FIGS. 3 and 4 are schematic perspective views of a protruding structure having a shape of a frustum of a pyramid.
Figure 4:
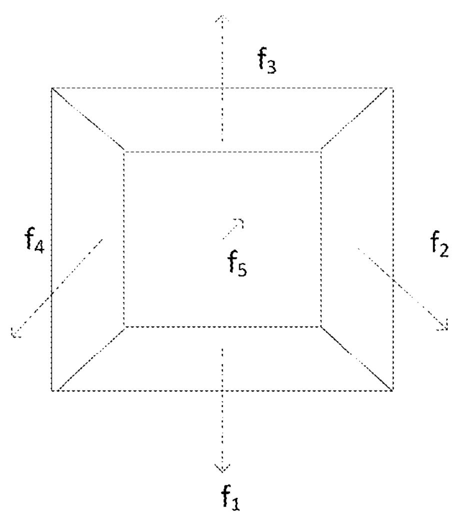

FIGS. 3 and 4 are schematic perspective views of a protruding structure having a shape of a frustum of a quadrangular pyramid. Referring to FIGS. 2 and 3, when the protruding structures a are frusta of a pyramid, the contact area of each of the protruding structures and the adhesive 200 is $s_1+s_2+s_3+s_4+s_5$, including the areas $(s_1+s_2+s_3+s_4)$ of four side faces and the area $s_5$ of a top face. Referring to FIG. 2, when the insulating layer is provided, on its surface away from the base, with a plurality of protruding structures a, a gap having an area $s_6$ is further formed between any two protruding structures a. For the touch screen 100 as shown in FIG. 2, there are five protruding structures which are spaced apart at an identical interval, and a total contact area between the touch screen 100 and the adhesive 200 is $5\times(s_1+s_2+s_3+s_4+s_5)+4\times s_6$. If a bottom face of the protruding structure a opposite to the top face has an area of $S_5'$ (not shown in the figures), the touch screen 100 provided with the protruding structures and the adhesive 200 have a contact area which is $5\times(s_1+s_2+s_3+s_4+s_5)+4\times s_6$ and much larger than the contact area between the touch screen 100 that is not provided with the protruding structures and the adhesive 200, which is $5\times s_{5'}+s_6$. In addition, since the frustum of a pyramid may include a frustum of quadrangular pyramid, of pentagonal pyramid, of hexagonal pyramid and of N-gonal pyramid. When the frustum of a pyramid has more side faces, it will have a larger surface area and also a larger contact area with the adhesive 200. Therefore, the frustum of a pyramid exhibits an advantage over the protruding structures having other shapes.

As shown in FIGS. 2 and 4, when the protruding structure a is a frustum of a pyramid, four side faces and a top face of the frustum of a pyramid may contribute to dispersing the force. With reference to FIG. 4, forces acting on the four side faces are $f_1$, $f_2$, $f_3$ and $f_4$, respectively, and the force acting on the top face is $f_5$. Since FIG. 4 shows a perspective view, the directions of the acting forces cannot be accurately marked, and you may refer to the directions of arrows shown in FIG. 2 for details. For the touch screen 100 in FIG. 2, there are five protruding structures, each of which is applied by forces in five directions, and thus the forces are dispersed. In addition, the gap between any two protruding structures may contribute to the force dispersion, such as $s_6$ in FIG. 2. In addition, the frustum of a pyramid includes a frustum of quadrangular pyramid, of pentagonal pyramid, of hexagonal pyramid and of N-gonal pyramid. Therefore, when the frusta of a pyramid have more side faces, their force dispersion condition will be better, and the frustum of a pyramid exhibits an advantage over the protruding structures having other shapes.

Referring to FIG. 2, when the touch screen 100 and the display screen 300 are bonded using an optical clear resin 200, the protruding structures having the shape of a frustum of a pyramid provided on the insulating layer of the touch screen 100 can not only increase the contact area between the touch screen 100 and the optical clear resin 200 by several times, but also improve the dispersion of forces acting on the display screen 300 after the bonding. In particular, when the display screen 300 is a liquid crystal display module, the use of the protruding structures having the shape of a frustum of a pyramid may change the force acting on the bonded liquid crystal display module from the original single directional force to multi-directional forces, especially forces acting on the side faces of the frustum of a pyramid. In this way, it is able to effectively reduce yellow spots, whitening conditions and other display defects caused by twisted arrangement of the liquid crystal due to force concentration on the liquid crystal display module.

Since in the touch screen provided in this embodiment of the present disclosure, the insulating layer is provided with several protruding structures, after the bonding of the display screen and the touch screen using the optical clear resin, it is able to increase the contact area between the optical clear resin and the touch screen, considerably increase the peeling force of the display screen after the bonding and effectively reduce the possibility of the peeling-off of the cured optical clear resin due to the warping of the glass. On the other hand, the original single directional force is changed to the multi-directional forces after the bonding, and the increase in the area acted by the forces and the increase in the direction of the forces may effectively reduce yellow spots, whitening conditions and other display defects caused by twisted arrangement of the liquid crystal due to force concentration on a display panel, especially a liquid crystal display module.

Figure 5:
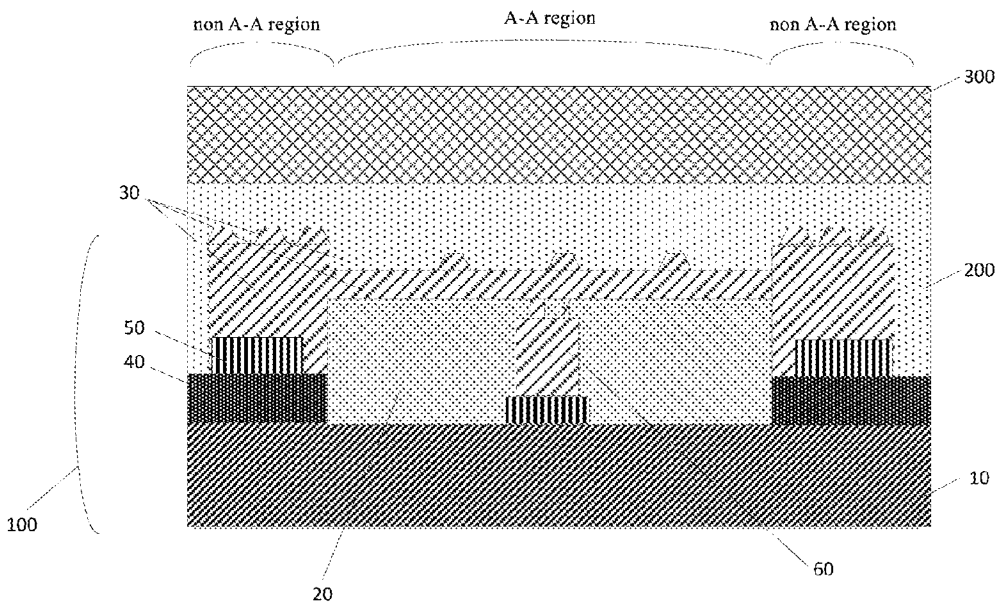
FIG. 5 is another structural schematic view of the touch screen provided in the embodiment 1 according to the present disclosure.

In an optional embodiment, referring to FIG. 5, the touch screen comprises a visible region (A-A region) and a non-visible region (non A-A region). The non-visible region corresponds to a metal wiring region.

The peeling off of the cured optical clear resin due to the warping of the glass occurs mostly in the non-visible region around the touch screen. Therefore, in order to further prevent the peeling-off of the cured optical clear resin, preferably, the protruding structures have a larger distribution density in the non-visible region than in the visible region. Since the protruding structures are densely distributed in the non-visible region, the non-visible region of the touch screen has a larger contact area with the optical clear resin when bonded to the display screen using the optical clear resin 200. As a result, the force for peeling is greater and the problem of the adhesive failure may be effectively prevented for the touch screen.

In an optional embodiment, in order to simplify the process, the protruding structures and the insulating layer are integrally formed.

Referring to FIG. 5, the protruding structures have a smaller distribution density in the visible region (A-A region) than in the non-visible region (non A-A region).

Referring to FIG. 5, the touch screen further includes a black ink layer 40 and a metal wiring layer 50. The black ink layer 40 is formed in a region of the substrate 10 corresponding to the non-visible region. The metal wiring layer 50 is provided on the black ink layer 40 and corresponds to the non-visible region.

Referring to FIG. 5, in the touch screen provided in the embodiment, the insulating layer is provided with the protruding structures. A maximum of the height h of the protruding structures may be equal to the height of the insulating layer. The line width of a channel (the width between two protruding structures) may be equal to the width of a top face of the protruding structure, and an actual design value may vary from a minimum of several microns to hundreds of microns. Since inclined side faces of the frustum of a pyramid may be formed using etching technology, the specific shape of the frustum of a pyramid may be designed as actually needed. The contact area between the cured optical clear resin and the touch screen may be increased by several times after the bonding, and the peeling force of the bonded screen may be considerably increased, and the peeling-off of the cured optical clear resin due to the warping of the glass may be effectively reduced. On the other hand, the acting force is changed from the original single directional force to multi-directional dispersion forces after the bonding. For example, forces acting in the directions of the inclined side faces of the frustum of a pyramid are increased. As a result, the increase in force transfer areas and the increase in the force acting directions may effectively reduce yellow spots, whitening conditions and other display defects caused by twisted arrangement of the liquid crystal due to force concentration on the liquid crystal display module.

Embodiment 2

The present disclosure provides in embodiment 2 a display device comprising a display screen 300 and a touch screen 100 as described in the previous embodiment, as shown in FIG. 2.

The display screen 300 and the surface of the touch screen 100 provided with the protruding structures are bonded using an adhesive 200. The adhesive 200 may be an optical clear resin or an optical clear adhesive. The display screen 300 includes a liquid crystal display module and/or an organic light-emitting diode display screen.

The display device provided in this embodiment includes the touch screen described in the previous embodiment, and thus has an advantage that the adhesive is not easy to be cracked.

Embodiment 3

Figure 6:
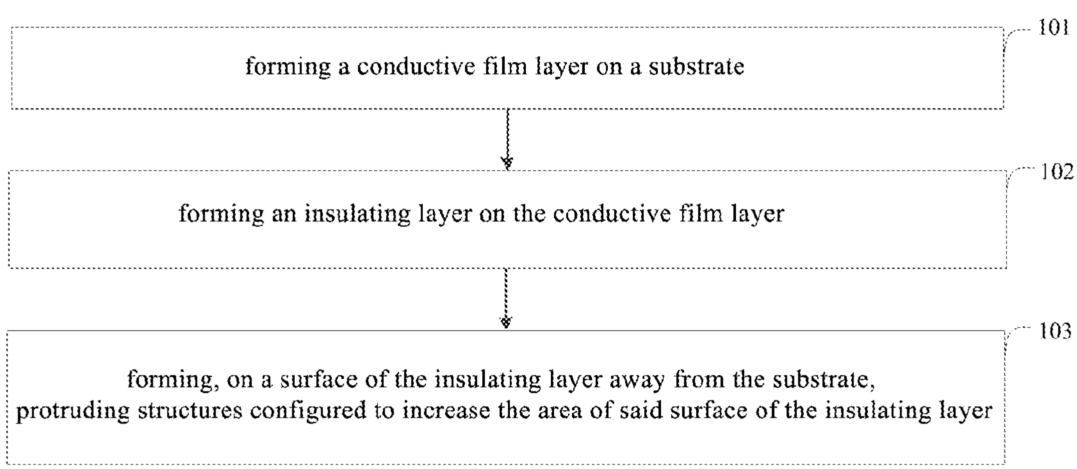
FIG. 6 is a flow chart of a method for manufacturing a touch screen provided in embodiment 3 according to the present disclosure.

The present disclosure provides in embodiment 3 a method of manufacturing a touch screen as described in the previous embodiment. As shown in FIG. 6, the method comprises the following steps 101 to 103.

Step 101: forming a conductive film layer on a substrate.

In this step, an ITO conductive thin film may be formed on the substrate to obtain the conductive film layer.

Step 102: forming an insulating layer on the conductive film layer.

Step 103: forming, on a surface of the insulating layer away from the substrate, protruding structures configured to increase the areas of the surface of the insulating layer.

In this step, the insulating layer is provided, on its surface away from the substrate, with the protruding structures configured to increase the area of the surface of the insulating layer. The step 103 comprises subjecting the insulating layer to photoetching so as to form the protruding structures on the surface of the insulating layer.

Further, the touch screen comprises a visible region (A-A region) and a non-visible region (non A-A region). The non-visible region corresponds to a metal wiring region.

Referring to FIG. 5, the touch screen 100 is formed using the method provided in this embodiment, which is bonded to the display screen 300 using an adhesive 200. The touch screen 100 comprises a substrate 10, a conductive film layer 20 (i.e., a touch control layer), an insulating layer 30, a black ink layer 40, a metal wiring layer 50 and a transparent insulating layer 60. The touch control layer is located on the substrate.

The manufacturing method will be illustrated as follow by taking a five mask processes as an example: the black ink layer 40, the metal wiring layer 50, the transparent insulating layer 60, the conductive film layer 20 and the insulating layer 30 are formed sequentially by photoetching. The manufacturing method provided in this embodiment does not need any additional process. Thus, the process is simple and easy to realize.

Further, the touch screen and the liquid crystal display module are bonded as follows: firstly, an adhesive such as an optical clear resin is coated on the touch screen, and they are brought into full contact with each other by means of vacuum deaeration and pre-curing; secondly, a liquid crystal display module and the touch screen are directly bonded and cured in a vacuum environment.

Using the touch screen formed in this embodiment has the following advantages.

First, the insulating layer is formed, on its surface, with the protruding structures by photoetching, which achieves the increase in the contact area and the peeling force.

Second, the protruding structures have inclined side faces which may result in force dispersion and reduction of the amount of deformation of the liquid crystal display module.

Third, it is possible to increase the peeling force and reduce the display defects due to the bending of the screen acted by forces without any additional process.

Fourth, high ratio of fine products can be achieved without extra cost, and the market competitiveness of the directly bonded display screen is thus considerably improved.

In the description of the present disclosure, it shall be noted that, an orientation or position relationship indicated by words such as "on" and "under" is the orientation or position relationship as shown in the drawings, and is merely for facilitating and simplifying the description of the present disclosure, and these words do not indicate or imply that the specified device or element must have a specific orientation and be constructed and operated in a specific orientation, and thus should not be construed as limiting the present disclosure. Unless otherwise clearly specified and defined, terms "install", "connected to" and "connect" should be construed in a broad sense. For example, they may refer to fixed connection or detachable connection or integral connection, or to mechanical connection or electrical connection, or to direct connection or indirect connection by means of an intermediate medium or communication of inner portions of two elements. For a person skilled in the art, these terms in the present disclosure may be construed in a specific context.

It shall be also noted that, in this context, relationship terms such as "first" and "second" are merely for separating one entity or operation from another entity or operation without necessarily requiring or implying the presence of any actual relationship or sequence between these entities or operations. Moreover, terms "comprise", "include" or any other variants thereof are intended to encompass a non-exclusive inclusion such that a process, method, article or device comprising a series of elements comprises other elements that are not clearly listed, in addition to these elements, or further comprises elements inherent to the process, method, article or device. In the absence of more restrictions, a statement "comprising . . . " does not preclude the presence of other identical elements in the process, method, article, or device that includes these elements defined by this statement.

The above embodiments are merely for illustrating the technical solutions of the present disclosure, and are not intended to limit it. Although the present disclosure has been illustrated in detail with reference to the foregoing embodiments, it shall be understood by a person having ordinary skills in the art that modifications may be made to the technical solutions described in the embodiments, or part of the technical features may be replaced by equivalents thereof. Such medications or replacements shall not make corresponding technical solutions depart from the sprit and scope of the technical solutions described in the embodiments of the present disclosure.

What is claimed is:

1. A display device, comprising:

a touch screen comprising:

a substrate, a conductive film layer, and an insulating layer, a black ink layer, a metal wiring layer, and a transparent insulating layer, an adhesive, and a display screen, wherein the insulating layer is provided, on its surface away from the substrate, with protruding structure that are integrally formed with the insulating layer and configured to increase an area of the surface of the insulating layer, wherein the touch screen comprises a visible region and a non-visible region, and the protruding structures have a larger distribution density in the non-visible region than in the visible region, wherein the substrate, the black ink layer, the metal wiring layer, and the insulating layer are sequentially stacked in the non-display region such that the black ink layer contacts the substrate, the metal wiring layer contacts the black ink layer, and the insulating layer contacts both the metal wiring layer and the black ink layer, wherein, in the display region, the conductive film layer and the metal line layer contact the substrate, the transparent insulating layer is disposed on the metal wiring layer, and the insulating layer is disposed on both the conductive film layer and the transparent insulating layer, and wherein the display screen and the protruding structures of the insulating layer are bonded using the adhesive.

2. The display device according to claim 1, wherein the protruding structures are one or more of a frustum of a cone, a frustum of a pyramid, a rectangular parallelepiped, a spherical crown, a cone, a cylinder, and a prism.

3. The display device according to claim 1, wherein the protruding structures are frusta of a pyramid.

4. The display device according to claim 1, wherein the adhesive includes an optical resin and/or an optical clear adhesive.

5. The display device according to claim 1, wherein the display screen comprises a liquid crystal display module and/or an organic light-emitting diode display screen.

* * * * *